United States Patent
Tang et al.

(10) Patent No.: US 9,755,373 B2
(45) Date of Patent: Sep. 5, 2017

(54) SMART CARD CONNECTION CIRCUIT OF ELECTRONIC DEVICE AND ELECTRONIC DEVICE

(71) Applicant: Huawei Device Co., Ltd., Shenzhen, CA (US)

(72) Inventors: Kedi Tang, Shanghai (CN); Lin Hu, Shanghai (CN); Zhonghui Peng, Shanghai (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 447 days.

(21) Appl. No.: 14/566,884

(22) Filed: Dec. 11, 2014

(65) Prior Publication Data

US 2015/0093938 A1    Apr. 2, 2015

Related U.S. Application Data

(63) Continuation of application No. PCT/CN2013/090804, filed on Dec. 28, 2013.

(30) Foreign Application Priority Data

Jan. 7, 2013  (CN) .......................... 2013 1 0005012

(51) Int. Cl.
| | |
|---|---|
| *B23K 11/24* | (2006.01) |
| *H02B 1/24* | (2006.01) |
| *H01R 13/703* | (2006.01) |
| *G06F 13/40* | (2006.01) |
| *G06K 7/00* | (2006.01) |

(52) U.S. Cl.
CPC ....... *H01R 13/703* (2013.01); *G06F 13/4068* (2013.01); *G06K 7/0069* (2013.01)

(58) Field of Classification Search
USPC ......... 307/112; 361/1, 2, 18, 607; 439/1, 43, 439/607, 33
See application file for complete search history.

(56) References Cited

U.S. PATENT DOCUMENTS

| | | | |
|---|---|---|---|
| 6,354,881 B1 * | 3/2002 | Bricaud | G06K 7/0021 235/475 |
| 2001/0054148 A1 * | 12/2001 | Hoornaert | E21B 41/0042 713/172 |

(Continued)

FOREIGN PATENT DOCUMENTS

| | | |
|---|---|---|
| CN | 101902513 A | 12/2010 |
| CN | 102710827 A | 10/2012 |

(Continued)

OTHER PUBLICATIONS

Partial English Translation and Abstract of Japanese Patent Application No. JPA2010225059, Apr. 4, 2016, 23 pages.

(Continued)

*Primary Examiner* — Adam Houston
(74) *Attorney, Agent, or Firm* — Conley Rose, P.C.

(57) ABSTRACT

A smart card connection circuit of an electronic device which includes a card holder, a travel switch, and a switching unit; a contact of the travel switch is located in the card holder, and an output end of the travel switch is connected to a control end of the switching unit; and when a smart card at a preset position in the card holder leaves the preset position, the smart card leaves the contact of the travel switch, the travel switch controls the switching unit to switch to a second output end, and each signal cable pin on the card holder is grounded by using the switching unit before a power cable pin on the card holder is grounded by using the switching unit. The present invention is applied to electronic devices such as a mobile phone and a tablet computer.

10 Claims, 3 Drawing Sheets

(56) References Cited

U.S. PATENT DOCUMENTS

| | | | | |
|---|---|---|---|---|
| 2002/0066791 | A1* | 6/2002 | Leydier | G06F 13/4086 235/492 |
| 2005/0240695 | A1* | 10/2005 | Leaming | G06K 19/07 710/104 |
| 2005/0240704 | A1* | 10/2005 | Leaming | G06F 13/387 710/301 |
| 2006/0053244 | A1* | 3/2006 | Fruhauf | G06F 13/4068 710/313 |
| 2006/0065743 | A1* | 3/2006 | Fruhauf | G06F 13/385 235/492 |
| 2007/0117587 | A1 | 5/2007 | Tsao | |
| 2009/0070621 | A1 | 3/2009 | Yanagi | |
| 2009/0181717 | A1 | 7/2009 | Lo et al. | |
| 2011/0119497 | A1* | 5/2011 | Tsai | G06F 21/77 713/185 |
| 2012/0083315 | A1 | 4/2012 | Kawakishi et al. | |
| 2013/0340069 | A1* | 12/2013 | Yoffe | G06F 21/30 726/17 |
| 2015/0261543 | A1* | 9/2015 | Lahteenmaki | G06F 15/17337 712/225 |

FOREIGN PATENT DOCUMENTS

| | | | | |
|---|---|---|---|---|
| CN | 102761638 | A | 10/2012 | |
| CN | 202551148 | U | 11/2012 | |
| CN | 103064816 | A | 4/2013 | |
| CN | 103094793 | A * | 5/2013 | G06F 13/4068 |
| JP | 2008219731 | A | 9/2008 | |
| JP | 2010225059 | A | 7/2010 | |
| JP | 2011076419 | A | 4/2011 | |
| JP | 2012181087 | A | 9/2012 | |
| JP | 2012238323 | A | 12/2012 | |
| WO | 2011016080 | A1 | 2/2011 | |

OTHER PUBLICATIONS

Foreign Communication From a Counterpart Application, Japanese Application No. 2015-521973, Japanese Office Action dated Feb. 2, 2016, 3 pages.
Foreign Communication From a Counterpart Application, Japanese Application No. 2015-521973, English Translation of Japanese Office Action dated Feb. 2, 2016, 3 pages.
Partial English Translation and Abstract of Japanese Patent Application No. JPA2008219731, Nov. 11, 2016, 41 pages.
Partial English Translation and Abstract of Japanese Patent Application No. JPA2011076419, Nov. 11, 2016, 41 pages.
Partial English Translation and Abstract of Japanese Patent Application No. JPA2012181087, Nov. 11, 2016, 58 pages.
Partial English Translation and Abstract of Japanese Patent Application No. JPA2012238323, Nov. 11, 2016, 54 pages.
Foreign Communication From a Counterpart Application, Japanese Application No. 2015-521973, Japanese Office Action dated Sep. 27, 2016, 3 pages.
Foreign Communication From a Counterpart Application, Japanese Application No. 2015-521973, English Translation of Japanese Office Action dated Sep. 27, 2016, 3 pages.
Foreign Communication From a Counterpart Application, European Application No. 13870356.6, Extended European Search Report dated Aug. 11, 2015, 8 pages.
Partial English Translation and Abstract of Chinese Patent Application No. CN102710827A, Jan. 7, 2015, 4 pages.
Partial English Translation and Abstract of Chinese Patent Application No. CN103064816A, Jan. 7, 2015, 6 pages.
Partial English Translation and Abstract of Chinese Patent Application No. CN103094793A, Jan. 7, 2015, 3 pages.
Partial English Translation and Abstract of Chinese Patent Application No. CN202551148U, Jan. 7, 2015, 5 pages.
Foreign Communication From a Counterpart Application, Chinese Application No. 201310005012.9, Chinese Office Action dated Sep. 25, 2014, 6 pages.
Foreign Communication From a Counterpart Application, PCT Application No. PCT/CN2013/090804, English Translation of International Search Report dated Mar. 20, 2014, 3 pages.
Foreign Communication From a Counterpart Application, PCT Application No. PCT/CN2013/090804, Written Opinion dated Mar. 20, 2014, 5 pages.

* cited by examiner

SMART CARD CONNECTION CIRCUIT OF ELECTRONIC DEVICE AND ELECTRONIC DEVICE

CROSS-REFERENCE TO RELATED APPLICATIONS

This application is a continuation of International Application No. PCT/CN2013/090804, filed on Dec. 28, 2013, which claims priority to Chinese Patent Application No. 201310005012.9, filed on Jan. 07, 2013, both of which are hereby incorporated by reference in their entireties.

TECHNICAL FIELD

The present invention relates to the field of electronic information technologies, and in particular, to a smart card connection circuit of an electronic device, and an electronic device on which the smart card connection circuit is disposed.

BACKGROUND

With continuous development of electronic technologies, electronic devices such as mobile phones and tablet computers have become a common communication tool in people's daily life. Using a mobile phone as an example, a subscriber identity module (SIM) card is an important component in the mobile phone and is installed on a card holder inside the mobile phone. Contact sheets that are used to connect to a power cable, a ground cable and each signal cable are disposed on the SIM card. When the SIM card is installed on the card holder, these contact sheets are electrically connected to corresponding pins on the card holder, and are further connected to a modem of the mobile phone by using the card holder.

A normal power-off sequence for each contact sheet on the SIM card has each signal cable powered off before the power cable is powered off. However, in a process in which a user uses the mobile phone, the SIM card may be inserted or removed in a case in which the mobile phone is not turned off, or the SIM card may be detached from the card holder when the mobile phone drops unexpectedly, which easily causes the SIM card to be powered off without following the normal sequence, thereby causing the SIM card to be burned out. In addition, in a research and development process of the mobile phone, especially in a process of a drop test for the mobile phone, the SIM card may also be detached from the card holder, causing the SIM card to be burned out. Therefore, there exists a technical problem in the prior art that a SIM card is prone to be burned out when being detached from a card holder.

SUMMARY

Embodiments of the present invention provide a smart card connection circuit of an electronic device, and an electronic device on which the smart card connection circuit is disposed so as to resolve a technical problem in the prior art that a SIM card is prone to be burned out when being detached from a card holder.

To achieve the foregoing purpose, the following technical solutions are adopted in the embodiments of the present invention.

According to one aspect, the present invention provides a smart card connection circuit of an electronic device. The smart card connection circuit includes a card holder, a travel switch, and a switching unit. A power cable pin and each signal cable pin on the card holder are connected to corresponding interfaces at an input end of the switching unit. A contact of the travel switch is located in the card holder, and an output end of the travel switch is connected to a control end of the switching unit. When a smart card at a preset position in the card holder leaves the preset position, the smart card leaves the contact of the travel switch, the travel switch controls the switching unit to switch to a second output end, and each signal cable pin on the card holder is grounded by using the switching unit before the power cable pin on the card holder is grounded by using the switching unit.

In a first possible implementation manner, when there is a smart card at the preset position in the card holder, the smart card touches the contact of the travel switch, the travel switch controls the switching unit to switch to a first output end, and the power cable pin and each signal cable pin on the card holder are connected to a modem of the electronic device by using the switching unit.

With reference to the first possible implementation manner, in a second possible implementation manner, at the second output end, a first resistor is connected in series between each signal cable pin on the card holder and a ground cable, and a second resistor is connected in series between the power cable pin on the card holder and the ground cable, and a resistance value of the first resistor is less than that of the second resistor.

With reference to the first or the second possible implementation manner, in a third possible implementation manner, the output end of the travel switch is further connected to a general purpose input/output (GPIO) interface of the modem.

With reference to the third possible implementation manner, in a fourth possible implementation manner, the output end of the travel switch is further connected to a GPIO interface of an application processor of the electronic device.

With reference to the fourth possible implementation manner, in a fifth possible implementation manner, the output end of the travel switch is connected to the GPIO interface of the modem and to the GPIO interface of the application processor by using a phase inverter.

With reference to any one of the first to the fifth possible implementation manners, in a sixth possible implementation manner, in the travel switch, the output end is connected to a high-level voltage by using a pull-up resistor, and the output end is further grounded by using the contact. When the contact is open, the travel switch outputs a high-level voltage. When the contact is closed, the travel switch outputs a low-level voltage.

With reference to the sixth possible implementation manner, in a seventh possible implementation manner, the output end of the travel switch is connected to a filtering unit.

With reference to any one of the first to the seventh possible implementation manners, in an eighth possible implementation manner, the switching unit is a logic circuit, and each pin on the card holder is connected to each corresponding pin at the input end of the switching unit.

With reference to any one of the first to the eighth possible implementation manners, in a ninth possible implementation manner, the smart card is a subscriber identity module (SIM) card.

According to another aspect, the present invention further provides an electronic device, where the electronic device includes the smart card connection circuit according to any one of the foregoing implementation manners.

In a first possible implementation manner, the electronic device is a mobile phone or a tablet computer.

Compared with the prior art, the foregoing technical solutions provided by the present invention have the following advantages. Normally, a smart card is located at a preset position in a card holder and touches a contact of a travel switch, the travel switch controls a switching unit to switch to a first output end, and each contact sheet on the smart card is connected to a modem by using a corresponding pin on the card holder and the switching unit.

When the smart card is removed from the card holder in a case in which an electronic device is not turned off, or when the smart card is detached from the card holder because of various reasons such as being dropped, the smart card leaves the preset position in the card holder, but each contact sheet on the smart card remains electrically connected to a corresponding pin on the card holder. In this case, the contact of the travel switch has returned to its original position, and the travel switch controls the switching unit to switch to a second output end. A contact sheet of each signal cable on the smart card is grounded by using the card holder and the switching unit, before a contact sheet of a power cable on the smart card is grounded by using the card holder and the switching unit. In this way, each contact sheet on the smart card can be powered off in a normal sequence, thereby preventing the smart card from being burned out when being detached from the card holder, and resolving a technical problem in the prior art that the SIM card is prone to be burned out when being detached from the card holder.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
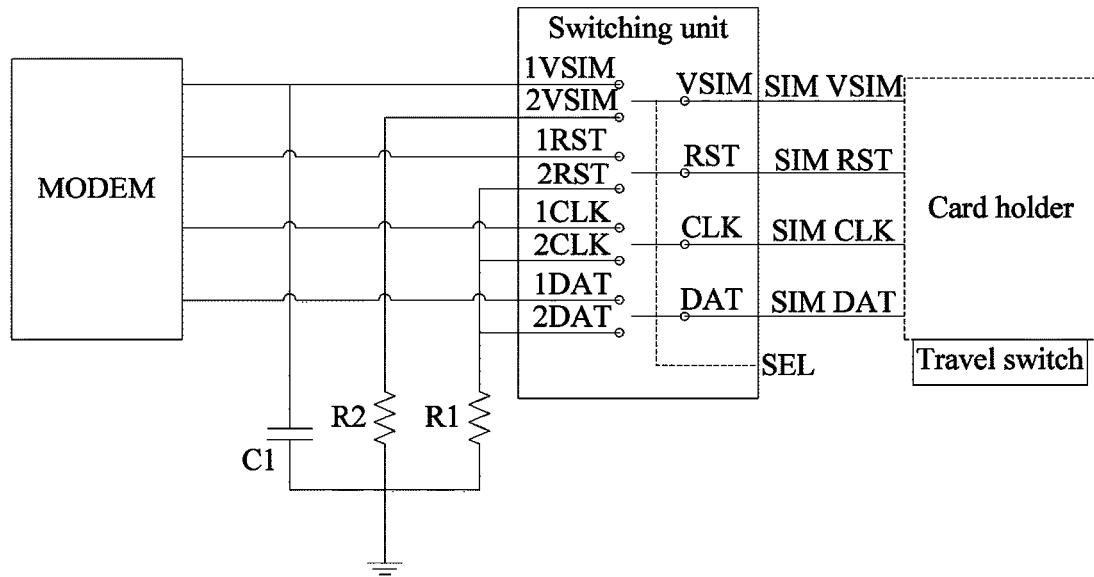
FIG. 1 is a schematic diagram of a smart card connection circuit according to Embodiment 1 of the present invention.

As shown in FIG. 1, a smart card connection circuit of an electronic device provided by this embodiment of the present invention may be applied to an electronic device such as a mobile phone or a tablet computer (pad). This embodiment is described by using a SIM card in a mobile phone as an example. The SIM card connection circuit includes a card holder, a travel switch, and a switching unit. The switching unit is equivalent to four synchronous single pole double throw switches, with an input end on the right side and two output ends on the left side, where a first output end is a modem of a mobile phone and a second output end is a ground terminal.

A power cable pin (VSIM) on the card holder and each signal cable pin (including a reset signal cable pin (RST), a clock signal cable pin (CLK) and a data cable pin (DAT)) are connected to corresponding interfaces at the input end of the switching unit, a contact of the travel switch is located in the card holder, and an output end of the travel switch is connected to a control end (SEL) of the switching unit.

When there is a SIM card at a preset position in the card holder, the SIM card touches the contact of the travel switch, the travel switch controls the switching unit to switch to the first output end (1VSIM, 1RST, 1CLK, and 1DAT), and the power cable pin and each signal cable pin on the card holder are connected to the MODEM of the mobile phone by using the switching unit.

When the SIM card at the preset position in the card holder leaves the preset position, the SIM card leaves the contact of the travel switch so that the contact of the travel switch returns to its original position. The travel switch controls the switching unit to switch to the second output end (2VSIM, 2RST, 2CLK, and 2DAT), and each signal cable pin on the card holder is grounded by using the switching unit before the power cable pin on the card holder is grounded by using the switching unit.

Normally, the SIM card is located at the preset position in the card holder and touches the contact of the travel switch, the travel switch controls the switching unit to switch to the first output end, and each contact sheet on the SIM card is connected to the MODEM by using a corresponding pin on the card holder and the switching unit.

When the SIM card is removed from the card holder in a case in which the mobile phone is not turned off, or when the SIM card is detached from the card holder because of various reasons such as being dropped, the SIM card leaves the preset position in the card holder, but each contact sheet on the SIM card remains electrically connected to a corresponding pin on the card holder. In this case, the contact of the travel switch has returned to its original position, and the travel switch controls the switching unit to switch to the second output end. A contact sheet of each signal cable on the SIM card is grounded by using the card holder and the switching unit, before a contact sheet of the power cable on the SIM card is grounded by using the card holder and the switching unit. In this way, each contact sheet on the SIM card can be powered off in a normal sequence, thereby preventing the SIM card from being burned out when being detached from the card holder, and resolving a technical problem in the prior art that the SIM card is prone to be burned out when being detached from the card holder.

It should be noted that the preset position in the card holder may be set as a certain range, as long as the SIM card can touch the contact of the travel switch within the range. In this way, the SIM card may have a certain range of normal looseness, preventing the contact of the travel switch from being too sensitive to cause the SIM card to be powered off when the SIM card is slightly loosen.

In this embodiment, the switching unit is a logic circuit, the VSIM, RST, CLK and DAT pins on the card holder are connected to corresponding pins at the input end of the switching unit. At the second output end of the switching unit, a first resistor R1 is connected in series between each of signal cable pins 2RST, 2CLK and 2DAT and a ground cable, a second resistor R2 is connected in series between the power cable pin 2VSIM and the ground cable, and a resistance value of R1 is less than that of R2. Generally, the resistance values of R1 and R2 may be selected between 1-10 kilo Ohms (KΩ), and the resistance value of R2 is 3 to 5 times that of R1. Therefore, when the switching unit switches to the second output end, it is equivalent to four single pole double throw switches in the interior of the switching unit simultaneously switching to the second output end. Because the resistance value of R1 is less than that of R2 between the second output end and the ground cable, each of signal cable pins 2RST, 2CLK and 2DAT is grounded before the power cable pin 2VSIM so that each contact sheet on the SIM card is powered off in a correct sequence.

In another embodiment, R1 and R2 may also be replaced by other components such as a capacitor or a delayer and be adjusted to appropriate parameters so as to enable 2RST, 2CLK, and 2DAT to be grounded before 2VSIM. It may also be that, in the switching unit, switches of 2RST, 2CLK, 2DAT and 2VSIM are separately controlled so as that 2RST, 2CLK, and 2DAT are grounded before 2VSIM is grounded.

It should be noted that, in this embodiment of the present invention, an input end, a first output end, and a second output end can all bidirectionally transmit a signal, and a specific transmission direction of the signal is not limited.

Embodiment 2

Figure 2:
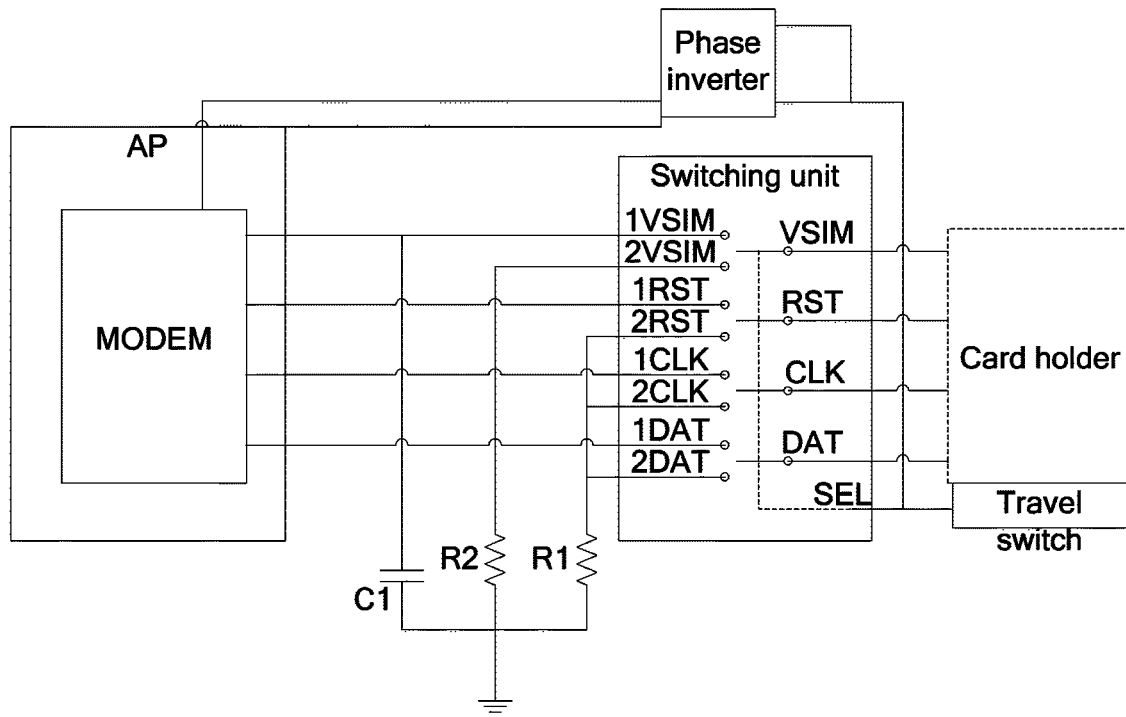
FIG. 2 is a schematic diagram of a smart card connection circuit according to Embodiment 2 of the present invention.
Figure 3:
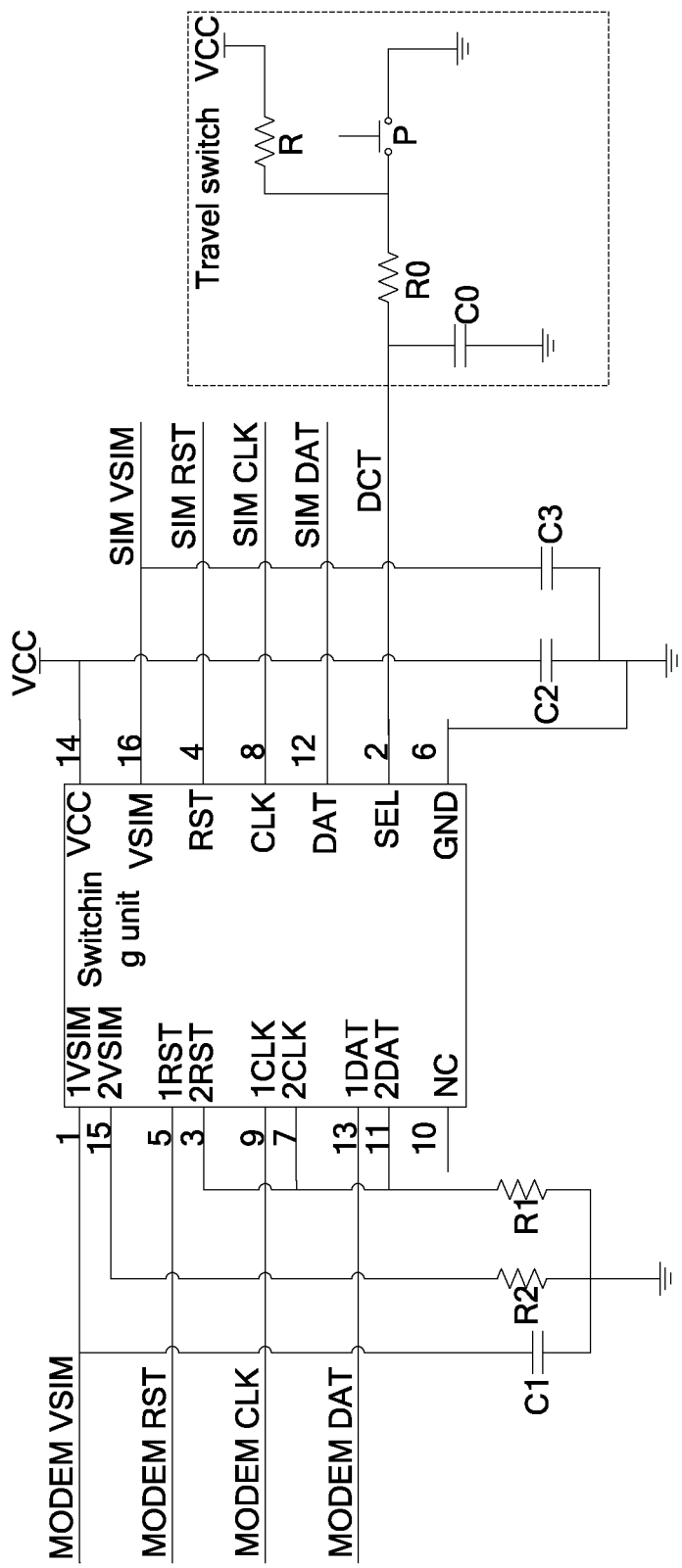
FIG. 3 is another schematic diagram of a smart card connection circuit according to Embodiment 2 of the present invention.

As shown in FIG. 2 and FIG. 3, in this embodiment, which is based on Embodiment 1, an output end of a travel switch is further connected to a general purpose input/output (GPIO) of a MODEM so that the MODEM can determine whether a SIM card is in position (a preset position in a card holder).

Further, the output end of the travel switch is further connected to a GPIO interface of an application processor (AP) of a mobile phone so that the AP can determine whether the SIM card is in position.

In addition, a correct power-on sequence of the SIM card is as follows. A power cable VSIM is powered on before each of signal cables CLK, RST, and DAT is powered on. When the SIM card is installed on the card holder and is located at the preset position, the SIM card touches a contact of the travel switch, and the AP of the mobile phone can detect, through the GPIO interface, that the SIM card is in position. Therefore, the AP can control a power cable of the SIM card to be powered on before each signal cable is powered on so as to enable the SIM card to start to work normally. Therefore, a smart card connection circuit provided in this embodiment not only implements removal of a card in a hot-swapping manner shown in Embodiment 1, but also can implement insertion of a card in a hot-swapping manner. That is, the smart card connection circuit in this embodiment can implement hot swap of a SIM card, enabling insertion and removal of a SIM card to be safer, faster and more convenient.

As shown in FIG. 3, in the travel switch in this embodiment of the present invention, the output end is connected to a high-level voltage by using a pull-up resistor R and, meanwhile, the output end is further grounded by using a contact P. When there is no SIM card at the preset position in the card holder, an initial state of the contact P is closed, the output end of the travel switch is grounded, and a low-level voltage is outputted. When the SIM card is in position, the SIM card touches the contact P to make the contact P open and the travel switch outputs a high-level voltage.

As a preferred solution, the output end of the travel switch is further connected to a filtering unit, which is configured to prevent a signal outputted by the travel switch from jittering when the SIM card is inserted or removed. In this embodiment, the filtering unit is a resistor-capacitor (RC) filter, which consists of a filter resistor R0 and a filter capacitor C0. In another embodiment, a filtering unit of any other form may also be adopted.

As shown in FIG. 3, the switching unit in this embodiment is a FSA2567, which is a low-power, dual SIM card analog switch commercially available from Fairchild Semiconductor International, Inc., of San Jose, Calif. The FSA2567 can meet a communication rate requirement of the SIM card, and ensures that bidirectional signals between the input end and the output end are not distorted. The output end of the travel switch is connected to a select pin (SEL) (control end) of the FSA2567. When the SEL is at a high-level voltage, an input end of the FSA2567 is connected to the first output end. When the SEL is at a low-level voltage, the input end of the FSA2567 is connected to the second output end.

Preferably, as shown in FIG. 2, a phase inverter is disposed at the output end of the travel switch. The output end of the travel switch is connected, by using the phase inverter, to a GPIO interface of the MODEM and to a GPIO interface of the AP. As shown in FIG. 2, the phase inverter has two channels of input/output. The output end of the travel switch is divided into two channels, which are connected to two input ends of the phase inverter respectively. Two output ends of the phase inverter are connected to the GPIO interfaces of the MODEM and the AP, respectively. In this way, signals inputted to the MODEM and the AP may be separated. Otherwise, when the GPIO interfaces of the MODEM and the AP are both at a high-level voltage, if the MODEM is powered off suddenly, the level voltage of the GPIO interface of the MODEM becomes a low-level voltage. Then, the level of the GPIO interface of the AP is also pulled to low, causing the AP to make an incorrect judgment about whether the SIM card is in position. On the contrary, if the AP is powered off suddenly, the MODEM also makes an incorrect judgment about whether the SIM card is in position.

The following table lists a relationship between a working status and level of each component in the SIM card connection circuit provided in this embodiment, and whether the SIM card is in position, where 0 represents a low-level voltage and 1 represents a high-level voltage.

| | SIM card in position | SIM card out of position |
|---|---|---|
| Status of the travel switch | Open | Closed |
| Output level of the travel switch | 1 | 0 |
| Status of the switching unit | Connected to a first output end | Connected to a second output end |
| Output level of the phase inverter | 0 | 1 |
| GPIO receive level and determining result of the AP | 0, SIM card in position | 1, SIM card out of position |
| GPIO receive level and determining result of the MODEM | 0, SIM card in position | 1, SIM card out of position |

It should be noted a logic control signal of a smart card connection circuit provided by the present invention is not limited to the implementation manners listed in the foregoing table. In another implementation manner, a setting for a travel switch may be changed so that a low-level voltage is outputted when the SIM card is in position and a high-level voltage is outputted when the SIM card is out of position. Then, connection manners of a first output end and a second output end of a switching unit are interchanged, that is, the first output end of the switching unit is connected to a ground cable and the second output end is connected to a MODEM, which also achieves a technical effect of preventing a SIM card from being burned out when being detached from a card holder.

Embodiment 3

Figure 4:
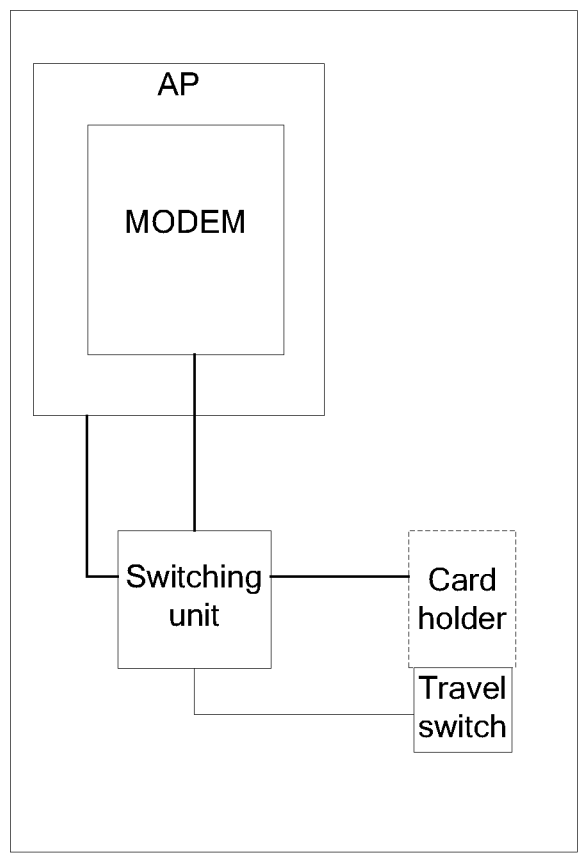
FIG. 4 is a schematic diagram of an electronic device according to Embodiment 3 of the present invention.

As shown in FIG. 4, according to another aspect, the present invention further provides an electronic device, on which the smart card connection circuit according to either of the foregoing Embodiment 1 and Embodiment 2 is disposed. The electronic device may specifically be a mobile phone (a cell phone), which uses the smart card connection circuit to prevent a SIM card in the mobile phone from being burned out when the SIM card is detached from a card holder.

As shown in FIG. 4, the card holder in the mobile phone is configured to install the SIM card. Each contact sheet on the SIM card is connected to a switching unit by using the card holder and is further connected to a MODEM by using a first output end of the switching unit. When the SIM card leaves a preset position in the card holder, a travel switch controls the switching unit to switch to a second output end, and each signal cable pin on the card holder is grounded by using the switching unit first before a power cable pin on the card holder is grounded by using the switching unit so as to prevent the SIM card from being burned out when being detached from the card holder.

In this embodiment, the mobile phone further includes an AP. When the SIM card is installed in the card holder, the AP may detect, through a GPIO interface, that the SIM card is in position and the AP can control a power cable on the SIM card to be powered on before each signal cable is powered on so as to enable the SIM card to start to work normally. Therefore, the electronic device provided in this embodiment of the present invention implements hot swap of a smart card.

The electronic device may also be a tablet computer. When a SIM card is inserted into the tablet computer, the SIM card may be used for network connection. Therefore, the smart card connection circuit may also be used in the tablet computer to prevent the SIM card from being burnt out when being detached from the card holder.

The electronic device provided in this embodiment of the present invention has the same technical features as the smart card connection circuit provided in the foregoing embodiments, and therefore can also create the same technical effect and resolve the same technical problem.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A smart card connection circuit of an electronic device, comprising;
   a card holder;
   a travel switch; and
   a switching unit,
   wherein a power cable pin and each signal cable pin on the card holder are connected to corresponding interfaces at an input end of the switching unit,
   wherein a contact of the travel switch is located in the card holder, and an output end of the travel switch is connected to a control end of the switching unit, and
   wherein the smart card leaves the contact of the travel switch, the travel switch controls the switching unit to switch to a second output end, and each signal cable pin on the card holder is grounded by using the switching unit before the power cable pin on the card holder is grounded by using the switching unit when a smart card at a preset position in the card holder leaves the preset position.

2. The smart card connection circuit according to claim 1, wherein, when there is a smart card at the preset position in the card holder, the smart card touches the contact of the travel switch, the travel switch controls the switching unit to switch to a first output end, and the power cable pin and each signal cable pin on the card holder are connected to a modem of the electronic device by using the switching unit.

3. The smart card connection circuit according to claim 1, wherein, at the second output end, a first resistor is connected in series between each signal cable pin on the card holder and a ground cable, wherein a second resistor is connected in series between the power cable pin on the card holder and the ground cable, and wherein a resistance value of the first resistor is less than that of the second resistor.

4. The smart card connection circuit according to claim 3, wherein the output end of the travel switch is further connected to a general purpose input/output (GPIO) interface of the modem.

5. The smart card connection circuit according to claim 4, wherein the output end of the travel switch is further connected to a GPIO interface of an application processor of the electronic device.

6. The smart card connection circuit according to claim 5, wherein the output end of the travel switch is connected, by using a phase inverter, to the GPIO interface of the modem and to the GPIO interface of the application processor.

7. The smart card connection circuit according to claim 6, wherein, in the travel switch, the output end is connected to a high-level voltage by using a pull-up resistor, wherein the output end is further grounded by using the contact, and wherein the travel switch outputs a high-level voltage when the contact is open and the travel switch outputs a low-level voltage when the contact is closed.

8. The smart card connection circuit according to claim 7, wherein the output end of the travel switch is connected to a filtering unit.

9. The smart card connection circuit according to claim 1, wherein the switching unit is a logic circuit, and wherein each pin on the card holder is connected to each corresponding pin at the input end of the switching unit.

10. The smart card connection circuit according to claim 1, wherein the smart card is a subscriber identity module (SIM) card.

* * * * *

UNITED STATES PATENT AND TRADEMARK OFFICE
CERTIFICATE OF CORRECTION

PATENT NO. : 9,755,373 B2
APPLICATION NO. : 14/566884
DATED : September 5, 2017
INVENTOR(S) : Kedi Tang, Lin Hu and Zhonghui Peng It is certified that error appears in the above-identified patent and that said Letters Patent is hereby corrected as shown below:

On the Title Page

Item [71], should read:
Huawei Device Co., Ltd., Shenzhen (CN)

Signed and Sealed this
Twenty-second Day of May, 2018

Andrei Iancu
*Director of the United States Patent and Trademark Office*